United States Patent
Ruutu et al.

(10) Patent No.: US 12,444,421 B2
(45) Date of Patent: Oct. 14, 2025

(54) COMPUTER-IMPLEMENTED METHOD FOR PUNCTUATION OF TEXT FROM AUDIO INPUT

(71) Applicant: Elisa Oyj, Helsinki (FI)

(72) Inventors: Ville Ruutu, Helsinki (FI); Jussi Ruutu, Helsinki (FI); Honain Derrar, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/842,368

(22) PCT Filed: Apr. 14, 2023

(86) PCT No.: PCT/FI2023/050208
§ 371 (c)(1),
(2) Date: Aug. 28, 2024

(87) PCT Pub. No.: WO2023/209274
PCT Pub. Date: Nov. 2, 2023

(65) Prior Publication Data
US 2025/0111854 A1   Apr. 3, 2025

(30) Foreign Application Priority Data
Apr. 27, 2022   (FI) .................................... 20225351

(51) Int. Cl.
*G10L 15/05*   (2013.01)
*G10L 15/08*   (2006.01)
(Continued)

(52) U.S. Cl.
CPC ............. *G10L 15/26* (2013.01); *G10L 15/05* (2013.01); *G10L 15/08* (2013.01); *G10L 15/14* (2013.01);
(Continued)

(58) Field of Classification Search
None
See application file for complete search history.

(56) References Cited

U.S. PATENT DOCUMENTS

| 6,067,514 A | * | 5/2000 | Chen | ...... | G10L 15/18 |
| | | | | | 704/235 |
| 7,680,657 B2 | * | 3/2010 | Shi | ......... | G10L 25/87 |
| | | | | | 704/218 |

(Continued)

FOREIGN PATENT DOCUMENTS

| CN | 102231278 B | * | 8/2013 |
| CN | 114512118 A | * | 5/2022 |

(Continued)

OTHER PUBLICATIONS

Translation of CN-114512118-A (Year: 2022).*
(Continued)

*Primary Examiner* — Richard Z Zhu
(74) *Attorney, Agent, or Firm* — FRESH IP PLC; Michael H. Anderson

(57) ABSTRACT

Disclosed herein is a computer-implemented method for punctuation of text from audio. The method includes obtaining an audio input comprising speech data; identifying a plurality of silent sections in the audio input; grouping the plurality of silent sections into a plurality of groups, where each group in the plurality of groups corresponds to a punctuation mark or a space without a punctuation mark; and associating each silent section in the plurality of silent sections with a punctuation mark or a space according to the grouping of the silent sections, thus obtaining punctuation information.

11 Claims, 3 Drawing Sheets

(51) Int. Cl.
*G10L 15/14* (2006.01)
*G10L 15/26* (2006.01)
*G10L 25/93* (2013.01)
*G10L 15/02* (2006.01)
*G10L 15/04* (2013.01)
*G10L 25/03* (2013.01)
*G10L 25/18* (2013.01)
*G10L 25/78* (2013.01)
*G10L 25/87* (2013.01)

(52) U.S. Cl.
CPC .............. *G10L 25/93* (2013.01); *G10L 15/02* (2013.01); *G10L 15/04* (2013.01); *G10L 25/03* (2013.01); *G10L 25/18* (2013.01); *G10L 25/78* (2013.01); *G10L 25/87* (2013.01)

(56) References Cited

U.S. PATENT DOCUMENTS

| | | | | |
|---|---|---|---|---|
| 9,607,613 | B2* | 3/2017 | Buchanan | G10L 25/87 |
| 10,242,669 | B1* | 3/2019 | Sandler | G10L 15/22 |
| 2001/0056344 | A1* | 12/2001 | Ramaswamy | G10L 15/22 |
| | | | | 704/235 |
| 2008/0300875 | A1* | 12/2008 | Yao | G10L 15/065 |
| | | | | 704/E15.009 |
| 2013/0018656 | A1* | 1/2013 | White | G10L 15/193 |
| | | | | 704/235 |
| 2014/0350939 | A1* | 11/2014 | Liu | G06F 40/237 |
| | | | | 704/257 |
| 2023/0181093 | A1* | 6/2023 | Shinkawa | A61B 5/742 |
| | | | | 704/251 |

FOREIGN PATENT DOCUMENTS

WO        2014187069 A1    11/2014
WO    WO-2022166218 A1 *  8/2022    ............ G10L 15/02

OTHER PUBLICATIONS

IP.com translation of WO2022166218A1. (Year: 2022).*
IP.com translation of CN102231278B. (Year: 2013).*
EP23719429 written opinions dated Jun. 14, 2023. (Year: 2023).*
EP23719429 written opinions dated Jul. 9, 2024 and Jan. 11, 2024. (Year: 2024).*
International Search Report and Written Opinion for International Application No. PCT/FI2023/050208 , mailing date of Jun. 14, 2023.
Search Report and Office Action for FI Application No. 20225351, dated Nov. 16, 2022.
Written Opinion of IPEA for International Application No. PCT/FI2023/050208 , mailing date of Jan. 11, 2024.
Office Action for FI Application No. 20225351, dated Mar. 8, 2024.
International Preliminary Report on Patentability (IPRP) Chapter II International Application No. PCT/FI2023/050208, mailing date of Jul. 9, 2024.
Levy et al., "The Effect of Pitch, Intensity and Pause Duration in Punctuation Detection", 2012 IEEE 27th Convention of Electrical and Electronics Engineers in Israel, 2012, pp. 1-4, Eilat, Israel, doi: 10.1109/EEEI.2012.6376934.
Rabiner, L.R., "A tutorial on hidden Markov models and selected applications in speech recognition," in Proceedings of the IEEE, Feb. 1989, vol. 77, No. 2, pp. 257-286, doi: 10.1109/5.18626.

* cited by examiner

COMPUTER-IMPLEMENTED METHOD FOR PUNCTUATION OF TEXT FROM AUDIO INPUT

CROSS-REFERENCE TO RELATED APPLICATION

This application is a National Phase entry of International Application No. PCT/FI2023/050208 under § 371 and claims the benefit of Finnish Patent Application No. FI20225351, filed Apr. 27, 2022, which is hereby incorporated by reference in its entirety.

FIELD OF THE DISCLOSURE

The present disclosure relates to language processing, and more particularly to a computer-implemented method for punctuation of text from an audio input, a computing device, and a computer program product.

BACKGROUND

When speech data is converted into text, information about the punctuation of the text needs to be typically obtained separately, since the speech data does not directly comprise information about the punctuation. Text punctuation could be implemented using, for example, machine learning techniques. A machine learning model can be trained to apply punctuation to text based on training material. However, such an approach usually requires large amounts of training data. Collecting such training data can be time-consuming and require manual work.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide a computer-implemented method for punctuation of text from an audio input, a computing device, and a computer program product. The foregoing and other objectives are achieved by the features of the independent claims. Further implementation forms are apparent from the dependent claims, the description and the figures.

According to a first aspect, a computer-implemented method for punctuation of text from an audio: obtaining an audio input comprising speech data; identifying a plurality of silent sections in the audio input; grouping the plurality of silent sections into a plurality of groups, wherein each group in the plurality of groups corresponds to a punctuation mark or a space without a punctuation mark; and associating each silent section in the plurality of silent sections with a punctuation mark or a space according to the group of the silent section, thus obtaining punctuation information. The method can, for example, efficiently provide the punctuation information.

In an implementation form of the first aspect, each group in the plurality of groups corresponds to a range of silent section temporal duration. The method can, for example, efficiently provide the punctuation information by utilising silent section temporal duration.

In another implementation form of the first aspect, the grouping the plurality of silent sections into the plurality of groups is done using a clustering algorithm. The method can, for example, efficiently group the silent sections.

In another implementation form of the first aspect, the clustering algorithm comprises k-means clustering. The method can, for example, efficiently group the silent sections using k-means clustering.

In another implementation form of the first aspect, the grouping the plurality of silent sections into the plurality of groups is done at least partially by using an expected distribution indicating an expected relative frequency of each group in the plurality of groups. The method can, for example, efficiently group the silent sections by utilising the expected distribution.

In another implementation form of the first aspect, the expected distribution indicating an expected relative frequency of each group in the plurality of groups is at least partially based on an expected distribution of punctuation marks.

In another implementation form of the first aspect, the grouping the plurality of silent sections into the plurality of groups comprises: determining at least one threshold temporal duration based on the expected distribution, wherein the at least one threshold temporal duration corresponds to a threshold between two groups in the plurality of groups; and grouping the plurality of silent sections into the plurality of groups by comparing the temporal duration of each silent section in the plurality of silent sections to the at least one threshold temporal duration. The method can, for example, efficiently group the silent sections based on the at least one threshold temporal duration.

In another implementation form of the first aspect, the method further comprises, before grouping the plurality of silent sections into the plurality of groups: obtaining a type input indicating a type of the speech data in the audio input; and choosing the expected distribution according to the type input. The method can, for example, utilise the type input in choosing the expected distribution appropriately.

In another implementation form of the first aspect, a silent section in the plurality of silent sections is grouped into the plurality of groups using the expected distribution at least when the silent section cannot be grouped based on silent section temporal duration. The method can, for example, group each silent section even when a silent section cannot be grouped reliably based on the temporal duration.

In another implementation form of the first aspect, the method further comprises: performing a speech-to-text conversion on the audio input, thus obtaining a transcript of the speech data; and punctuating the transcript according to the punctuation information. The method can, for example, punctuate a transcript of speech data.

According to a second aspect, a computing device comprises at least one processor and at least one memory including computer program code, the at least one memory and the computer program code being configured to, with the at least one processor, cause the computing device to perform the method according to the first aspect.

According to a third aspect, a computer program product comprises program code configured to perform the method according to the first aspect when the computer program product is executed on a computer.

Many of the attendant features will be more readily appreciated as they become better understood by reference to the following detailed description considered in connection with the accompanying drawings.

BRIEF DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
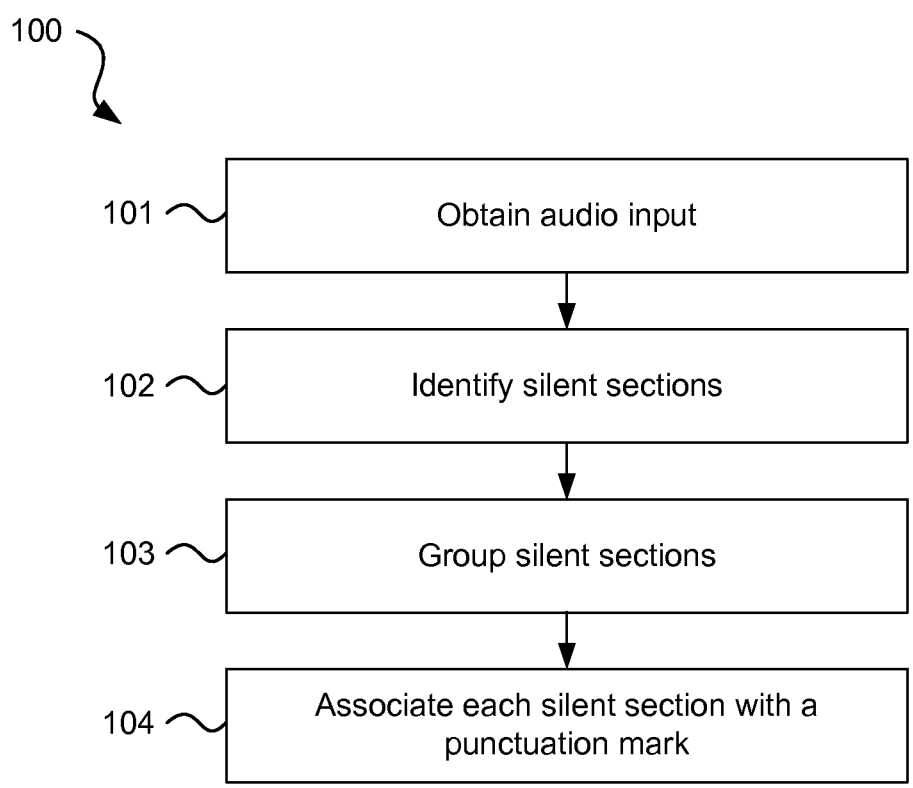
FIG. 1 illustrates a flow chart representation of a method according to an embodiment.

FIG. 1 illustrates a flow chart representation of a method according to an embodiment.

According to an embodiment, a computer-implemented method 100 for punctuation of text from an audio comprises obtaining 101 an audio input comprising speech data.

The audio input may also be referred to as audio data, audio information, an audio file, or similar.

The audio input may comprise, for example, a batch of audio as an audio file or a continuous audio stream.

The method 100 may further comprise identifying 102 a plurality of silent sections in the audio input.

The silent sections can be identified by, for example, identifying parts of the audio input that have a volume below a preconfigured volume threshold. Alternatively, any other method, such as a machine learning base method, can be used.

The method 100 may further comprise grouping 103 the plurality of silent sections into a plurality of groups, wherein each group in the plurality of groups corresponds to a punctuation mark or a space without a punctuation mark.

Herein, a punctuation mark may refer to any mark used in text to indicate punctuation, such as a comma, a period, a colon, a semicolon, an exclamation mark, and/or a question mark.

The method 100 may further comprise associating 104 each silent section in the plurality of silent sections with a punctuation mark or a space according to the group of the silent section, thus obtaining punctuation information.

The punctuation information may indicate which punctuation mark each silent section corresponds to. Thus, the punctuation information can be used to punctuate a text corresponding to the speech data.

According to an embodiment, the grouping the plurality of silent sections into the plurality of groups is done using a clustering algorithm.

Alternatively, the grouping can be done in any other manner, such as those disclosed herein.

According to an embodiment, the clustering algorithm comprises k-means clustering.

Alternatively, the clustering can be performed using any other clustering algorithm.

In some embodiments, the method 100 may utilise outlier analysis to, for example, identify silent sections that should not be grouped in the same fashion as other silent sections. For example, the speech data may comprise pauses that are significantly longer than any other silent section in the speech data. These may be due to, for example, the speaker stopping to think and should, therefore, not be correlated with a punctuation mark. The identified outliers can be, for example, excluded from the grouping.

The method 100 may be utilised in, for example, speech-to-text technologies. For example, the method 100 may be implemented in a speech-to-text bot configured to obtain information from users by, for example, phone. The transcript may then be used for further data processing of the obtained information.

At least some embodiments disclosed herein can improve the quality of transcript texts.

At least some embodiments disclosed herein can improve usability of automatic speech recognition.

Unlike automatic punctuation recovery methods, the method 100 can utilise speech features rather than textual features. Thus, the risk of cascading errors from one system to another can be reduced.

The method 100 can also be used together with a text analysis approach, such as machine learning based, to, for example, enhance punctuation accuracy.

The method 100 may require sufficient calibration related to the expected silence section duration distributions and decision thresholds.

Figure 2:
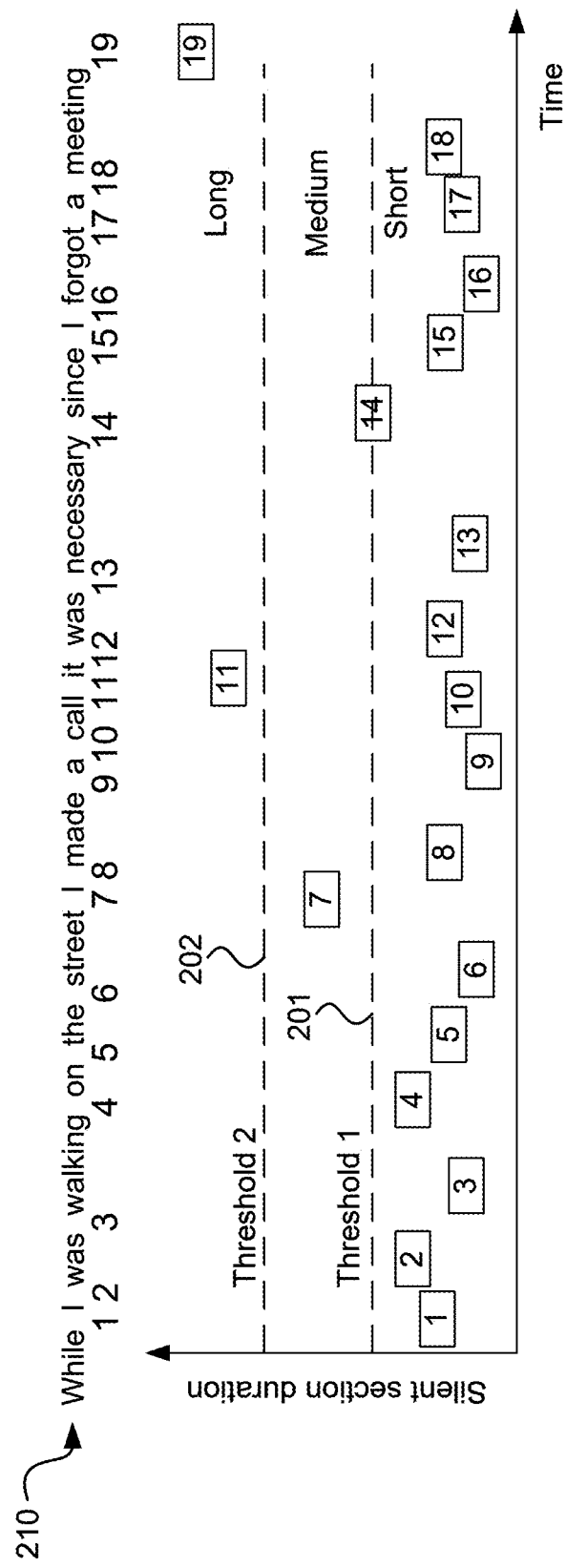
FIG. 2 illustrates a schematic representation of grouping of silent sections according to an embodiment.

FIG. 2 illustrates a schematic representation of grouping of silent sections according to an embodiment.

In the embodiment of FIG. 2, an example sentence 210 is illustrated. Each silent section in the example sentence is numbered according to the order of the silent sections and the duration of each silent section is plotted as a function of time in FIG. 2.

According to an embodiment, each group in the plurality of groups corresponds to a range of silent section temporal duration.

A temporal duration may also be referred to as a length, a duration, a temporal length, or similar.

For example, in the embodiment of FIG. 2, two threshold durations are illustrated. Silent sections shorter than a first threshold 201 are considered short, silent sections longer than the first threshold 201 but shorter than a second threshold 202 are considered medium length, and silent sections longer than the second threshold 202 are considered long. For silent sections belonging to short group, no punctuation marks may be applied. For silent sections belonging to the medium length group, commas may be applied. For silent sections belonging to the long group, periods may be applied.

According to an embodiment, the grouping the plurality of silent sections into the plurality of groups is done at least partially by using an expected distribution indicating an expected relative frequency of each group in the plurality of groups.

For example, in the embodiment of FIG. 2, the expected distribution may indicate that typically 80% of silent sections are without any punctuation marks, 10% of silent sections correspond to commas, and 10% of silent sections correspond to periods. Thus, the method 100 can utilise statistical information about the silence sections between spoken words to apply punctuation.

According to an embodiment, the grouping the plurality of silent sections into the plurality of groups comprises: determining at least one threshold temporal duration based on the expected distribution, wherein the at least one threshold temporal duration corresponds to a threshold between two groups in the plurality of groups, and grouping the plurality of silent sections into the plurality of groups by comparing the temporal duration of each silent section in the plurality of silent sections to the at least one threshold temporal duration.

For example, the at least one threshold can be set based on the expected distribution. For example, if the expected distribution indicates the aforementioned percentages, the at least one threshold can be set such that 80% of the silent sections are in the short group, 10% are in the medium length group, and 10% are in the long group. Alternatively, the thresholds can be set in some other manner and the expected distribution may be utilised to, for example, group silent sections that cannot be clearly grouped based on the at least one threshold.

According to an embodiment, the method 100 further comprises, before grouping the plurality of silent sections into the plurality of groups: obtaining a type input indicating a type of the speech data in the audio input and choosing the expected distribution according to the type input.

The expected distribution can vary based on the type of the speech data. The type input may indicate that the speech data is, for example, a customer service call, a public speech, a lecture etc.

According to an embodiment, a silent section in the plurality of silent sections is grouped into the plurality of groups using the expected distribution at least when the silent section cannot be grouped based on silent section temporal duration.

The expected distribution can be applied to make a decision on cases where it is not obvious which group a silent section belongs to. For example, in the embodiment of FIG. 2, silent section #14 can be assumed to belong to the medium length group based on the expected distribution even though the silent section is close to the first threshold 201.

Figure 3:
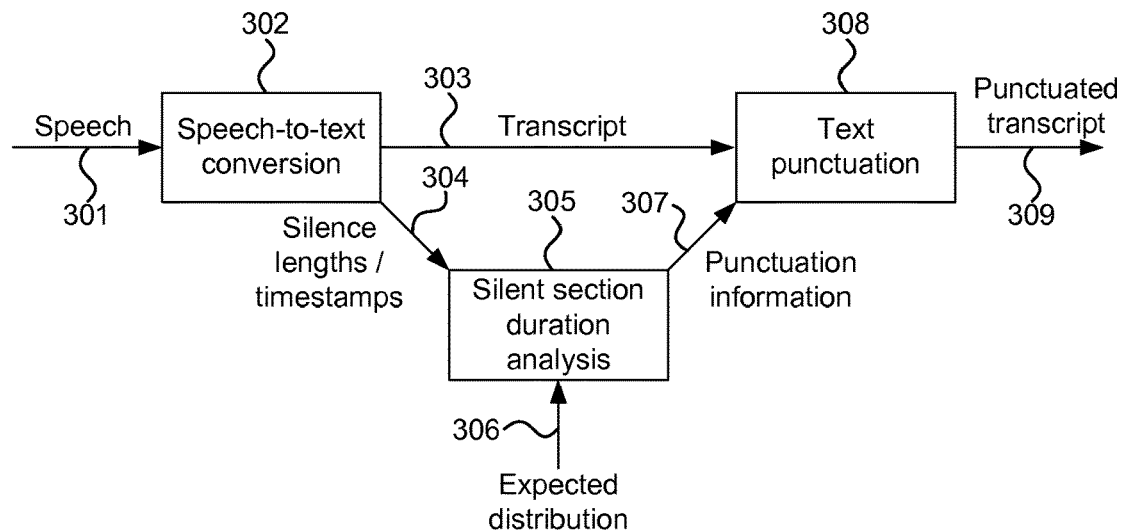
FIG. 3 illustrates a schematic representation of modules according to an embodiment.

FIG. 3 illustrates a schematic representation of modules according to an embodiment.

According to an embodiment, the method 100 further comprises: performing a speech-to-text conversion on the audio input, thus obtaining a transcript of the speech data, and punctuating the transcript according to the punctuation information.

According to an embodiment, the speech-to-text conversion further produces time stamp information of the plurality of silent sections and the plurality of silent sections is identified based on the time stamp information.

The speech data 301 can be provided to a speech-to-text conversion module/process 302. The speech-to-text conversion 302 can transcribe the speech data to a text transcript 303. The speech-to-text conversion 302 can also produce timestamp information 304 for words from which silent section durations can be calculated. The timestamp information 304 can comprise, for example, a timestamp for the beginning and end of each word. Thus, the silent sections durations can be calculated based on the timestamp information 304. Alternatively or additionally, the speech-to-text module 302 can provide the silent section durations directly.

The timestamp and/or silent section duration information 304 can be provided to a silent section duration analysis module/process 305. If timestamps are received, silent section durations can be calculated.

The silent section durations analysis 305 can group the silent sections to groups according to the method 100. The silent section analysis 305 can also utilise information about the expected distribution 306 of silent section durations. Punctuation information 307 can thus be obtained.

The punctuation information 307 and the text transcript 303 can be provided to a text punctuation module/process 308. The text punctuation 308 can provide a punctuated transcript 309 based on the text transcript 303 and the punctuation information 307.

Figure 4:
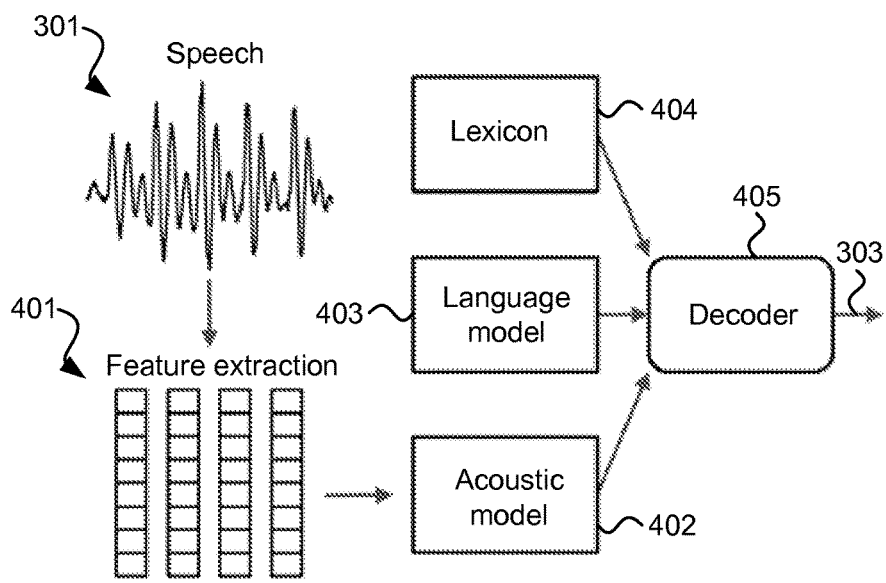
FIG. 4 illustrates a schematic representation of speech-to-text conversion according to an embodiment.

FIG. 4 illustrates a schematic representation of speech-to-text conversion according to an embodiment.

The text-to-speech module can perform feature extraction 401 on the speech data 301. The extracted features can be provided to an acoustic model 402. The acoustic model 402 can comprise a statistical model that identifies sound units from the speech data 301.

A decoder 405 can deduce the text based on information from various components, such as the acoustic model 402, a language model 403, and a lexicon 404. The language model 403 can comprise a statistical model that scores how likely words are to occur with each other in a given language. The lexicon 404 can comprise a pronunciation dictionary that indicates how words are constructed from sound units.

The embodiment of FIG. 4 is only an example of a text-to-speech module. Alternatively, the text-to-speech module may be implemented in various other ways.

Figure 5:
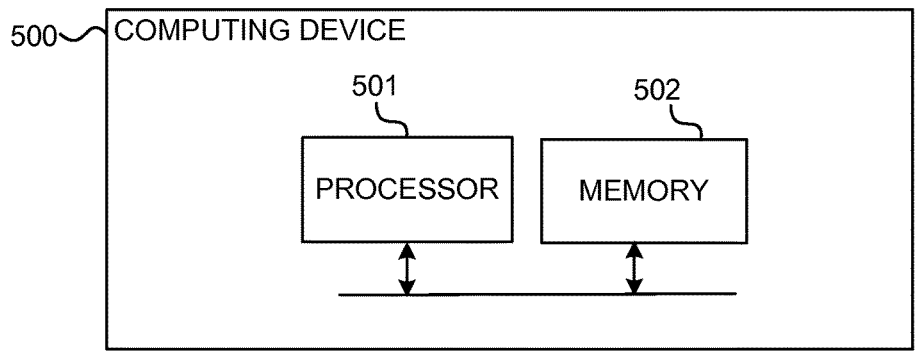
FIG. 5 illustrates a schematic representation of a computing device according to an embodiment.

FIG. 5 illustrates a schematic representation of a computing device according to an embodiment.

According to an embodiment, a computing device 500 comprises at least one processor 501 and at least one memory 502 including computer program code. The at least one memory 502 and the computer program code may be configured to, with the at least one processor 501, cause the computing device 500 to perform the method 100.

The computing device 500 may comprise at least one processor 501. The at least one processor 501 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The computing device 500 may further comprise a memory 502. The memory 502 may be configured to store, for example, computer programs and the like. The memory 502 may comprise one or more volatile memory devices, one or more non-volatile memory devices, and/or a combination of one or more volatile memory devices and non-volatile memory devices. For example, the memory 502 may be embodied as magnetic storage devices (such as hard disk drives, magnetic tapes, etc.), optical magnetic storage devices, and semiconductor memories (such as mask ROM, PROM (programmable ROM), EPROM (erasable PROM), flash ROM, RAM (random access memory), etc.).

The computing device 500 may further comprise other components not illustrated in the embodiment of FIG. 5. The computing device 500 may comprise, for example, an input/output bus for connecting the computing device 500 to other devices. Further, a user may control the computing device 500 via the input/output bus and/or the computing device 500 may obtain the audio input via the input/output bus.

When the computing device 500 is configured to implement some functionality, some component and/or components of the computing device 500, such as the at least one processor 501 and/or the memory 502, may be configured to implement this functionality. Furthermore, when the at least one processor 501 is configured to implement some functionality, this functionality may be implemented using program code comprised, for example, in the memory.

The computing device 500 may be implemented at least partially using, for example, a computer, some other computing device, or similar.

The method 100 and/or the computing device 500 may be utilised in, for example, automatic speech recognition (ASR) application such as in a so-called voicebot. A voicebot may be configured to obtain information from users by, for example, phone and convert the voice information into text information using ASR. The method 100 may be used to add punctuation to the text. The voicebot may further be configured to further process, such as classify, the text information. The voicebot can, for example, ask questions about, for example, basic information from a customer in a customer service situation over the phone, obtain the answers using ASR and the method 100, and save the information in a system. Thus, the customer service situation can be made more efficient and user experience can be improved.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method for punctuation of text from an audio input, the method comprising:
obtaining an audio input comprising speech data;
identifying a plurality of silent sections in the audio input;
obtaining a type input indicating a type of the speech data in the audio input, wherein the type input indicates that the speech data is a customer service call, a public speech, or a lecture;
choosing an expected distribution, indicating an expected relative frequency of each group in a plurality of groups, according to the type input;
grouping the plurality of silent sections into the plurality of groups, wherein each group in the plurality of groups corresponds to a punctuation mark or a space without a punctuation mark, wherein the grouping the plurality of silent sections into the plurality of groups is done at least partially by using the expected distribution; and
associating each silent section in the plurality of silent sections with a punctuation mark or a space according to the group of the silent section, thus obtaining punctuation information,
performing a speech-to-text conversion on the audio input, thus obtaining a transcript of the speech data; and
punctuating the transcript according to the punctuation information by associating each silent section in the plurality of silent sections with the corresponding punctuation mark or the corresponding space without the punctuation mark;
wherein the expected distribution is based on statistical information about the plurality of silent sections between spoken words to apply punctuation.

2. The computer-implemented method according to claim 1, wherein each group in the plurality of groups corresponds to a range of silent section temporal duration.

3. The computer-implemented method according to claim 1, wherein the grouping the plurality of silent sections into the plurality of groups is done using a clustering algorithm.

4. The computer-implemented method according to claim 3, wherein the clustering algorithm comprises k-means clustering.

5. The computer-implemented method according to claim 1, wherein the expected distribution indicating an expected relative frequency of each group in the plurality of groups is at least partially based on an expected distribution of punctuation marks.

6. The computer-implemented method according to claim 5, wherein the grouping the plurality of silent sections into the plurality of groups comprises:
determining at least one threshold temporal duration based on the expected distribution, wherein the at least one threshold temporal duration corresponds to a threshold between two groups in the plurality of groups; and
grouping the plurality of silent sections into the plurality of groups by comparing the temporal duration of each silent section in the plurality of silent sections to the at least one threshold temporal duration.

7. The computer-implemented method according to claim 5, wherein a silent section in the plurality of silent sections is grouped into the plurality of groups using the expected distribution at least when the silent section cannot be grouped based on silent section temporal duration.

8. The computer-implemented method according to claim 1, further comprising:
- performing a speech-to-text conversion on the audio input, thus obtaining a transcript of the speech data; and
- punctuating the transcript according to the punctuation information.

9. The computer-implemented method according to claim 8, wherein the speech-to-text conversion further produces time stamp information of the plurality of silent sections, and wherein the plurality of silent sections is identified based on the time stamp information.

10. A computing device, comprising:
- at least one processor; and
- at least one memory including computer program code, the at least one memory and the computer program code configured to, with the at least one processor, cause the computing device to perform the method according to claim 1.

11. A non-transitory computer program product comprising program code configured to perform the method according to claim 1 when the computer program product is executed on a computer.

* * * * *